Nov. 15, 1966  K. V. CUSHMAN  3,285,311
THERMO-BARRIER FASTENER
Filed June 4, 1964
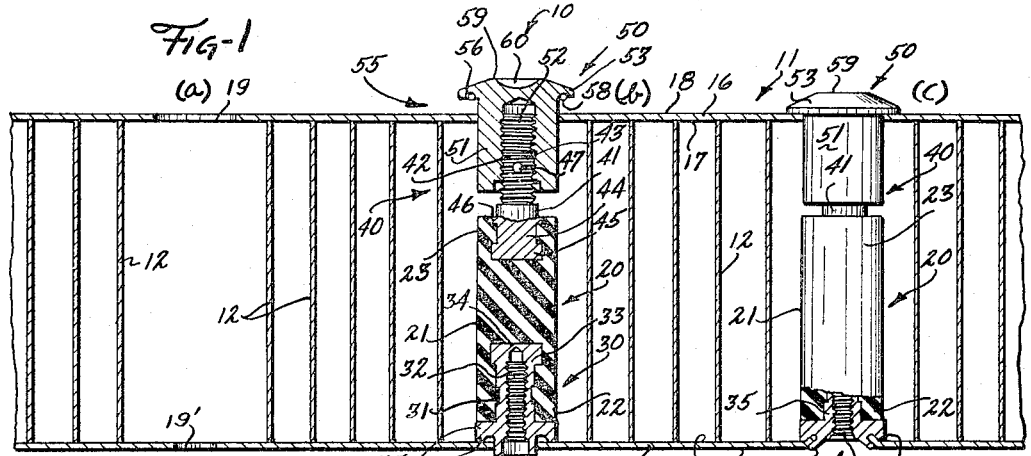
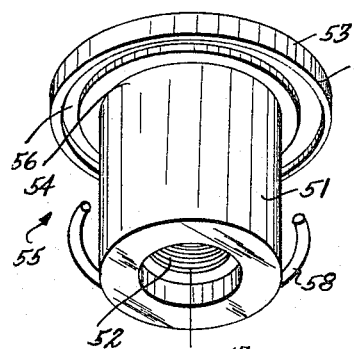
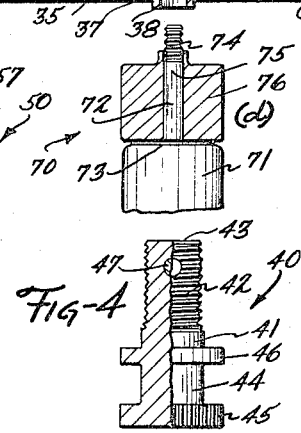
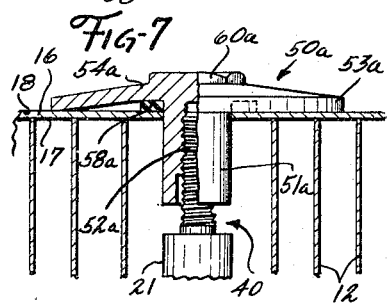
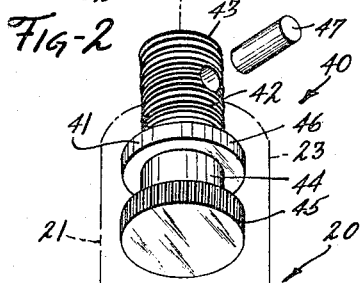
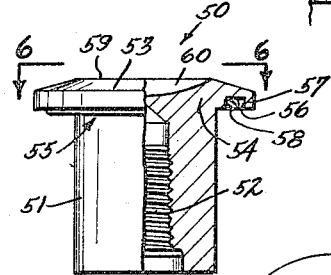
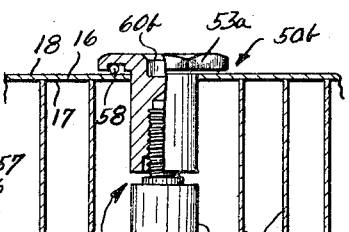
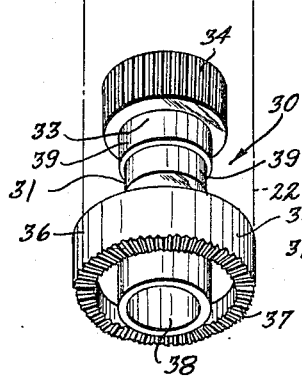
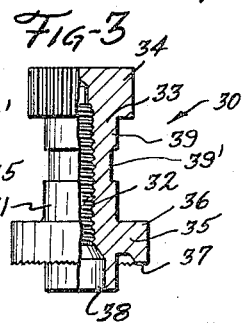
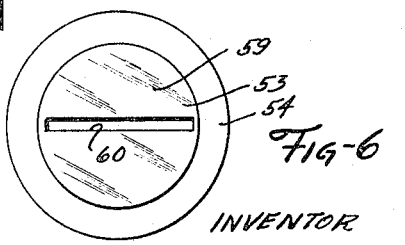
INVENTOR
KENNETH VANTINE CUSHMAN
BY Herzig & Walsh
ATTORNEYS United States Patent Office 3,285,311
Patented Nov. 15, 1966

3,285,311
THERMO-BARRIER FASTENER
Kenneth Vantine Cushman, 2138 Salta St.,
Santa Ana, Calif.
Filed June 4, 1964, Ser. No. 372,640
11 Claims. (Cl. 151—21)

In general, the present invention involves a fastener adapted to be mounted in a cored panel. More particularly, the present invention relates to an adjustable, easily installed fastener adapted to be mounted in a cored panel and to insulate against both heat and electrical transfer and radio frequency interference.

Because of the present day wide, geographical scope of man's activities, such as military installations, scientific expeditions, and oil and mineral explorations, there is a substantial need for portable housing units for both men and equipment. Presently, such portable housing units are mostly manufactured from prefabricated panels composed of two opposing cover sheets filled with a variety of cored material, such as a honeycomb lattice or rigid plastic foam and bonded to form a rigid structure. Such cored panels have the advantage of having the highest strength-to-weight ratio of any commonly known construction material. However, numerous problems have been encountered in fastening equipment or other fixtures to the walls, floors and ceilings of housing units made out of such cored panels because such portable housing units are used over a wide range of geographical areas and subjected to a great variety of adverse conditions. Thus, portable housing units may be subjected to extremely wide temperature ranges, from a minimum of −60° F. to a maximum of +150° F. and yet must seal out exterior elements, such as moisture, ice, fumes, and dust. Consequently, any fastening means attached to the cored panel structure must exhibit the same capabilities. In addition, they must maintain the high structural strength of the cored panel as well as being adjustable to compensate for the normal, considerable variations in panel thickness. Furthermore, for many installations the fastener which is installed within the cored panel must not only insulate against electrical and heat transfer, but also the radio frequency interference. Moreover, it is important that the fastener must be resistant to bolting torque and vibration loads and maintain such resistance after repeated installations. Finally, in addition to possessing the above described necessary and/or desirable features, a fastener for such cored panel structure must be capable of simple installation by unskilled labor using standard tools because of their use under field conditions.

Consequently, an object of the present invention is a fastener adapted to be mounted in a cored panel having opposed first and second sheets and which is adjustable and easily installed.

Another object of the present invention is a fastener adapted to be mounted in a cored panel which insulates against heat and electrical transfer as well as radio frequency interference.

Still another object of the present invention is a fastener adapted to be mounted in a cored panel which is adapted to distribute loads to both cover sheets of the cored panel to achieve maximum tension pull-out loads and adapted to minimize shear loads on the cored panel structure.

Still another object of the present invention is a fastener adapted to be mounted in a cored panel which forms a positive seal with both cover sheets of the panel.

Still another object of the present invention is a fastener adapted to be mounted in a cored panel which resists load torque and vibration loads between both the fastener and cored panel structure and the installation therein and is capable of maintaining such resistance after repeated installations.

Another object of the present invention is to provide a fastener of the type described which may be manufactured in two separate units that are preassembled at the factory for ease of handling, marking, and installation as an integral unit.

In general, the present invention invloves a fastener comprising a high-strength plastic block means having high thermal and electrical resistance with a connecting nut means embedded in its first end which is adapted to clamp onto and resist lateral, rotational and axial movement with respect to a first cover sheet of said cored panel. Embedded in the second opposite end of said block means are stud means and adjustably mounted on the stud means are metal head nut means adapted to clamp onto and resist lateral movement with respect to a second opposite cover sheet of said cored panel. The metal head nut means also is adapted to make a complete and direct metal-to-metal contact with the cover sheet or outer skin of the cored panel to maximize radio frequency resistance by acting as a shield.

In order to facilitate understanding of the present invention, reference will now be made to the appended drawings of preferred specific embodiments of the present invention. Such drawings should not be construed as limiting the invention which is properly set forth in the appended claims.

In the drawings:

FIGURES 1(a)–1(d) show a partially broken-away, cross-sectional side elevation of a first embodiment of the fastener means of the present invention illustrating the various steps involved in installing the fastener in a cored panel;

FIGURE 2 is an exploded perspective view of the fastener of FIGURE 1;

FIGURE 3 is a partial cross-section, side elevation of a connecting nut means portion of the fastener illustrated in FIGURE 1;

FIGURE 4 is a side elevation, partial cross-section of the stud means portion of the fastener shown in FIGURE 1;

FIGURE 5 is a side elevation, partial cross-section of the head nut means portion of the fastener shown in FIGURE 1;

FIGURE 6 is an end view of FIGURE 5 taken along line 6—6 of FIGURE 5;

FIGURE 7 is a partial, elevational view, with parts broken away to show internal construction, of a first modification of the fastener shown in FIGURE 1; and FIGURE 8 is a partial, elevational view, with parts broken away to show internal construction, of a second modification of the fastener shown in FIGURE 1.

As illustrated in FIGURES 1–6, the present invention involves a fastener 10 which is adapted to be mounted in a cored panel 11. The cored panel 11 includes a latticework core 12 having a first cover sheet 13 with an inner surface 14 and an outer surface 15 and a second opposed cover sheet 16 with an inner surface 17 and an outer surface 18. The fastener 10 comprises a high-strength plastic block means 20 having high thermal and electrical resistance. Plastic block means 20 is formed out of a cylindrical molded rod 21, preferably of an acetal resin such as "Delrin" produced by E. I. Du Pont de Nemours & Company of Wilmington, Delaware.

Embedded in the first end 22 of the block means 20 is a connecting nut means 30 which is adapted to clamp onto and resist lateral, rotational, and axial movement with respect to the first cover sheet 13 of the cored panel 11. The connecting nut means 30 comprises a tube 31 having internal threads 32. The inner end 33 of the tube 31 is molded into the block means 20 and has an outwardly extending knurled flange 34 which is adapted to resist axial and rotational movements of the connecting nut means 30 with respect to the block means 20. The outer end 35 of the tube 31 has an outwardly extending flange 36 which has a peripheral serrated lip 37 adapted to contact the inner surface 14 of the first cover sheet 13. Also, the outer end 35 of the tube 31 has an axially extending ridge 38. The tube ridge 38 and flange 36 are adapted to clamp the first cover sheet 13 therebetween. In addition, the connecting nut means 30 is adapted to removably lock onto the bolt means (not shown) inserted therein. Thus, the connecting nut means includes a circumferential thin belt 39 formed by a circumferential groove 39' which is embedded in the block means 20 and flexibly compressed to make an interference fit with the bolt means inserted into the connecting nut means 30.

Embedded in the second opposite end 23 of the block means 20 is a stud means 40 which comprises a post 41 having external threads 42 on its outer end 43 and molded into the block means 20 at its inner end 44. On the inner end 44 of the stud means 40 is an outwardly extending knurled flange 45, and adjacent thereto, but spaced therefrom, is a circumferential ridge 46. The knurled flange 45 and ridge 46 are adapted to engage the block means 20 therebetween and to resist axial and rotational movement of the post 41 with respect to the block means 20. Also, the stud 40 is adapted to removably lock onto the head nut means 50. Thus, the stud means 40 includes a resilient pellet 47, preferably made of nylon, set in its outer end 43 and adapted to make an interference fit with the head nut means 50.

Adjustably mounted on the stud means 40 is the metal head nut means 50 which is adapted to clamp onto and resist lateral movement with respect to the second opposed cover sheet 16 of the cored panel by making a complete and direct metal-to-metal contact therewith to maximize radio frequency resistance by acting as a shield. The head nut means 50 comprises a collar 51 having internal threads 52 and a radially enlarged cap 53 formed over its outer end or rim 54 and adapted to contact the outer surface 18 of the second cover sheet 16. The outer rim 54 of the cap 53 is tapered toward the outer surface 18 of the second cover sheet 16 and thus is adapted to reflect lateral forces exerted thereon. Also, the cap 53 has circumferential sealing means 55 adapted to contact the outer surface 18 of the second cover sheet 16. Such sealing means 55 include a circumferential groove 56 in the inner rim 57 of the cap 53 with a resilient O-ring 58 set therein. The top surface 59 of the cap 53 has a groove 60 formed therein having an arcuate longitudinal cross-section which is adapted to permit the head nut to be screwed into position while substantially maintaining a smooth top surface 59 on the cap 53.

The installation and use of the fastener of the present invention is illustrated primarily in FIGURE 1. As shown therein, the installation of the fastener 10 in the cored panel 11 involves initially drilling holes 19 and 19' in the second cover sheet 16 and the first cover sheet 13, respectively, which snugly fit the collar 51 of the head nut means 50 and the axial ridge 38 if the connecting nut means 30, respectively, as shown in FIGURE 1(a). The fastener 10 is then inserted through the hole 19 so that the axial ridge 38 is positioned in the hole 19' and the serrated lip 37 of the tube flange 36 adjoins the inner surface 14 of the first cover sheet 13, as shown in FIGURE 1(b). A mounting tool 70 is mounted in the nosepiece 71 of a pneumatic gun (not shown) and includes an axially extending mandrel 72 which extends from end 73 of nosepiece 71. The mandrel 72 has threads 74 on its free end 75 which are adapted to be inserted in the connecting nut means 30. As illustrated in FIGURE 1(d), rotatably mounted on the mandrel 72 is a flaring anvil 76 which is adapted to expand the axial ridge 38 of the connecting nut means 30 outwardly and then the first cover sheet 13 inwardly so that the first cover sheet 13 is engaged by the serrated lip 37 and clamped between the tube flange 36 and the tube ridge 38. The mounting tool 70 shown in FIGURE 1(d) is brought into engagement with the connecting nut means 30 whereupon the pneumatic gun (not shown) can be actuated so that the tube ridge 38 is flared outwardly and the first cover sheet 13 inwardly to present a flush surface with respect to the outer surface 15 of the first cover sheet 13. In addition, as noted above, the serrated lip 37 is also forced into engagement with the inner surface 14 of the first cover sheet 13 and the first cover sheet 13 is clamped between the tube flange 36 and the tube ridge 38. Then, as illustrated in FIGURE 1(c), the head nut means 50 may be tightened so that the O-ring 58 is compressed against the outer surface 18 of the second cover sheet 16 to form a positive seal therewith. The fastener 10 may then be utilized in normal service by having a bolt means (not shown) threaded into the connecting means 30. When threaded therein, the bolt means encounters substantial resistance when entering the belt 39 of the tube 31 and thus causes the belt to expand to permit further insertion of the bolt means into the connecting nut means 30. Such expansion not only generates a locking action of the bolt means due to the resistance to expansion of the belt, but also because of the resistance to expansion of the block means in which the belt is embedded. When the bolt means is subsequently removed, the belt 39 thereupon contracts to its initial compressed position and thus is ready to perform a locking action on repeated installations of bolt means. Furthermore, the embedding of the belt 39 in the block means 20 not only substantially increases the locking action of the belt 39, but also permits the maintenance of such locking action for a great number of repeated installations of bolt means because of the resiliency of the plastic block means 30. The resistance to bolting torque and vibration loads is achieved not only by the engagement of the first cover panel 13 with the connecting nut means 30 and the locking action of the connecting nut means 30 on the bolt means inserted therein, but also by the locking action of the pellet 47 on the stud means 40 which is compressed by the head nut means 50 to lock the head nut 50 into position on the stud means 40.

A modified form of the fastener of the type shown in FIGURE 1 is shown in FIGURE 7 wherein a head nut means 50a comprises a collar 51a having internal threads 52a and a radially enlarged cap 53a formed over the outer end 54a. The head nut means 50a is adapted to contact the outer surface 18 of the second cover sheet 16 whereupon the enlarged cap 53a distributes tension pull-out loads. The outer end or rim 54a of the cap 53a is tapered toward the outer surface 18 of the second cover sheet 16 and thus is adapted to deflect lateral forces exerted thereon. A hex head 60a is formed on top of the rim 54a to facilitate connecting the head nut means 50a to the means 40, which is identical to that shown in FIGURE 1. A flat neoprene washer 58a may be employed instead of the O-ring 58 shown in FIGURE 1 to minimize the cost thereof.

Referring now to FIGURE 8, a second modification of the head nut means shown in FIGURE 1 is identified by the numeral 50b and is identical to the one shown in FIGURE 1, except that the cap 53b is hexagonal-shaped and has a wrench socket 60b provided therein.

There are many features in the present invention which clearly show the significant advance it represents over the prior art. Consequently, only a few of the more outstanding features will be pointed out to illustrate the unexpected and unusual results attained by the present invention. One feature is a fastener adapted to be snugly fitted in both cover sheets of a cored panel structure so that when it is fully installed it distributes loads to both cover sheets to produce maximum tension pull-out loads. Furthermore, the snug fit of the fastener in both cover sheets restricts lateral movements of the cover sheet with respect to the fastener and thus provides maximum resistance to shear loads. Another feature of the present invention is a high-strength plastic block means positioned between a metal head nut means and connecting nut means. Thus, the structural strength of the fastener is maintained and the problem of heat flow and electrical flow is minimized due to the resistance of the plastic thereto. For example, when all-metal fasteners are utilized in connection with a cored panel under extremely cold temperature conditions, the fastener forms a cold spot on the inner surface of the housing unit where condensation forms to quickly corrode and render the fastener useless. Similarly, under high temperature conditions, such as in the desert, the all-metal fastener permits a substantial amount of heat flow into the housing unit which can affect the instruments therein and increase the air conditioning requirement of the unit. While the plastic block means produces electrical and heat insulation, the metal head nut means and connecting nut means at either end of the block means provide effective shielding against radio frequency interference. Also, since the head cap of the head nut means is radially enlarged, the joints between the fastener and the cored panel are shielded. Thus, the problems associated with prior art construction where cracks and drilled holes permitted feed-through of radio frequency interference even when plugged by plastic, have been eliminated.

Still another feature of the present invention is the positive seal formed by the compression of the O-ring between the cap of the head nut means and the cover sheet of the cored panel so that dust and fumes are prevented from leaking past the fastener into the housing unit. Still another feature of the present invention is the adjustability of the length of the fastener to compensate for a variation in thickness of the cored panel. Thus, the fastener of the present invention can vary its length over at least 1/8th inch to allow perfect installation.

Still another feature of the present invention is the resistance of the fastener to vibrational loads and load torque with respect to the cored panel, as well as its resistance to bolt means inserted therein. Thus, as noted above, the connecting nut means of the fastener positively clamp onto the cover sheet of the cored panel and mechanically engage therewith by the flow of the metal into and around the serrated lip. Furthermore, the stud means has locking means for resisting the rotation of the head nut means mounted thereon with respect to the stud means. Also, the connecting nut means has locking means to resist the rotation of the bolt means inserted therein. With respect to the connecting nut means locking action, it should be particularly noted that the embedding of the crimped belt in the plastic block substantially aids the locking action and increases its operating life. Still another feature of the present invention is the simple manner in which the fastener may be installed in a cored panel. Thus, merely a drill and a simple mounting tool need be utilized, as set forth above.

It will be understood that the foregoing description and examples are only illustrative of the present invention and it is not intended that the invention be limited thereto. All substitutions, alterations and modifications of the present invention which come within the scope of the following claims or to which the present invention is readily susceptible without departing from the spirit and scope of this disclosure are considered part of the present invention.

What is claimed is:

1. An adjustable, easily installed fastener adapted to be mounted in a cored panel and to insulate against both heat and electrical transfer and radio frequency interference, comprising:
   a high-strength substantially rigid plastic block means having high thermal and electrical resistance;
   connecting nut means embedded in the first end of said block means, said connecting nut means having spaced portions at least one of which is adapted to be deformed toward the other to clamp onto and resist lateral, rotational and axial movement with respect to a first cover sheet of said cored panel;
   stud means embedded in the second opposite end of said block means; and
   metal head nut means adjustably mounted on said stud means and having high radio frequency resistance, said head nut means having a laterally extending face adapted to abut and frictionally engage a second opposed cover sheet of said cored panel.

2. A fastener as stated in claim 1 wherein said plastic block means comprises a cylindrical molded rod of acetal resin.

3. A fastener as stated in claim 1 wherein said connecting nut means comprises an internally threaded tube having its inner end molded into said block means and wherein said spaced portions comprise an outwardly extending flange and an axially extending ridge on its outer end adapted to clamp said first cover sheet therebetween.

4. A fastener as stated in claim 3 wherein said connecting nut means includes an outwardly extending knurled flange on its inner end.

5. A fastener as stated in claim 3 wherein said connecting nut means includes a circumferential thin belt in said tube embedded in said block means and flexibly compressed to make an interference fit with bolt means inserted in said connecting nut means.

6. A fastener as stated in claim 1 wherein said stud means comprises a post externally threaded at its outer end and molded into said block means at its inner end and includes an outwardly extending knurled flange on its inner end and a circumferential ridge adjacent its inner end, said stud flange and ridge engaging said block means therebetween.

7. A fastener as stated in claim 1 wherein said laterally extending face is tapered toward the outer surface of said cover sheet.

8. A fastener as stated in claim 7 wherein said face has circumferential sealing means adapted to contact the outer surface of said second cover sheet.

9. A fastener as stated in claim 8 wherein said sealing means comprises a circumferential groove in the inner rim of said face with a resilient O-ring set therein.

10. An adjustable, easily installed fastener adapted to be mounted in a cored panel and to insulate against both heat and electrical transfer and radio frequency interference, comprising:
   a high-strength plastic block means having high thermal and electrical resistance;
   connecting nut means embedded in the first end of said block means, said connecting nut means being adapted to resist lateral, rotational, and axial movement with respect to a first cover sheet of said cored panel and to removably lock onto bolt means inserted therein and comprising an internally threaded tube having its inner end molded into said block means and having an outwardly extending flange and an axially extending ridge on its outer end adapted to clamp said first cover sheet therebetween, said tube flange having a peripheral serrated lip adapted to contact the inner surface of said first cover sheet;
   stud means embedded in the second opposite end of said block means and comprising a post externally threaded at its outer end and molded into said block means at its inner end; and
   metal head nut means adjustably mounted on said stud means and having high radio frequency resistance, said head nut means being adapted to resist lateral movement with respect to a second opposed cover sheet of said cored panel and comprising an internally threaded collar having a radially enlarged cap formed over its outer end and adapted to contact the outer surface of said second cover sheet, said cap having circumferential sealing means adapted to contact the outer surface of said second cover sheet and said stud means being adapted to removably lock onto said head nut means.

11. An adjustable, easily installed fastener adapted to be mounted in a cored panel and to insulate against both heat and electrical transfer and radio frequency interference, comprising:

a high-strength plastic block means having high thermal and electrical resistance;

connecting nut means embedded in the first end of said block means, said connecting nut means being adapted to resist lateral, rotational, and axial movement with respect to a first cover sheet of said cored panel and to removably lock onto bolt means inserted therein and comprising an internally threaded tube having its inner end molded into said block means and having an outwardly extending flange and an axially extending ridge on its outer end adapted to clamp said first cover sheet therebetween, said tube flange having a peripheral serrated lip adapted to contact the inner surface of said cover sheet and said tube having a circumferential thin belt embedded in said block means and flexibly compressed to make an interference fit with bolt means inserted in said connecting nut means;

stud means embedded in the second opposite end of said block means and comprising a post externally threaded at its outer end and molded into said block means at its inner end; and metal head nut means adjustably mounted on said stud means and having high radio frequency resistance, said head nut means being adapted to resist lateral movement with respect to a second opposed cover sheet of said cored panel and comprising an internally threaded collar having a radially enlarged cap formed over its outer end and adapted to contact the outer surface of said second cover sheet and having circumferential sealing means adapted to contact the outer surface of said second cover sheet, said sealing means comprising a circumferential groove in the inner rim of said cap with a resilient O-ring set therein and said stud means being adapted to removably lock onto said head nut means and including a resilient pellet set in its outer end and adapted to make an interference fit with said head nut means.

References Cited by the Examiner

UNITED STATES PATENTS

| | | | |
|---|---|---|---|
| 1,857,168 | 5/1932 | Steiner et al. | 248—9 |
| 1,864,080 | 6/1932 | Madge | 248—9 |
| 1,872,014 | 8/1932 | Schjolin | 85—4 |
| 2,092,919 | 9/1937 | Johnson | 248—22 |
| 2,641,434 | 6/1953 | Henshaw | 248—22 |
| 2,663,344 | 12/1953 | Burdick | 151—7 |

FOREIGN PATENTS 1,270,437  7/1961  France.

CARL W. TOMLIN, *Primary Examiner.*

M. PARSONS, JR., *Assistant Examiner.*